US008662052B2

(12) United States Patent
Garside

(10) Patent No.: US 8,662,052 B2
(45) Date of Patent: Mar. 4, 2014

(54) ROTARY PISTON INTERNAL COMBUSTION ENGINE POWER UNIT

(76) Inventor: David W. Garside, Birmingham (GB)

( * ) Notice: Subject to any disclaimer, the term of this patent is extended or adjusted under 35 U.S.C. 154(b) by 834 days.

(21) Appl. No.: 12/918,014

(22) PCT Filed: Mar. 6, 2009

(86) PCT No.: PCT/GB2009/000610
§ 371 (c)(1),
(2), (4) Date: Aug. 17, 2010

(87) PCT Pub. No.: WO2009/115768
PCT Pub. Date: Sep. 24, 2009

(65) Prior Publication Data
US 2010/0326753 A1    Dec. 30, 2010

(30) Foreign Application Priority Data
Mar. 19, 2008  (GB) .................................. 0805089.0

(51) Int. Cl.
*F02B 41/02* (2006.01)
*F02B 53/00* (2006.01)

(52) U.S. Cl.
USPC .......................... 123/245; 123/200; 418/61.2

(58) Field of Classification Search
USPC .............................. 123/200–249; 418/58–61.2
See application file for complete search history.

(56) References Cited

U.S. PATENT DOCUMENTS

| 3,091,386 | A | * | 5/1963 | Paschke | 418/61.2 |
| 3,102,683 | A | * | 9/1963 | Paschke et al. | 418/61.2 |
| 3,180,323 | A | * | 4/1965 | Paschke | 418/61.2 |
| 3,259,113 | A | * | 7/1966 | Hamada | 123/234 |
| 3,405,692 | A | * | 10/1968 | Paschke | 418/61.2 |
| 3,783,615 | A | * | 1/1974 | Hubers | 123/213 |

(Continued)

FOREIGN PATENT DOCUMENTS

| EP | 0273653 | 7/1988 |
| GB | 0969591 | 9/1964 |

(Continued)

OTHER PUBLICATIONS

David Biloen, International Search Report in PCT/GB2009/000319, Jun. 23, 2009, 3 pages, European Patent Office, Rijswijk, Netherlands.

(Continued)

*Primary Examiner* — Mary A Davis
(74) *Attorney, Agent, or Firm* — Florek & Endres PLLC

(57) ABSTRACT

A power unit (14) which has a spark-ignition engine unit (1) of the Wankel type including a three flanked rotary piston (R) mounted on an eccentric shaft (63) rotating eccentrically within a cavity within a two lobed epitroochoidal inner peripheral surface (14), the cavity including an inlet port (7) through which air at ambient pressure is induced into the working chambers, and an outlet port (45) through which exhaust gasses are exhausted from the working chambers, and the power unit also including a rotary expander unit (4) which has a two flanked rotor (24) mounted on an eccentric shaft (12) rotating eccentrically within a single lobed epitrochoidal chamber (25), both shafts (62, 63) being coupled to rotate together, and the exhaust port (45) of epitrochoidal cavity of the engine unit (1) being connected to an inlet port (26) of the expander unit (4) so that the exhaust gasses from the engine unit (1) are further expanded in the expander unit (4).

13 Claims, 6 Drawing Sheets

(56) References Cited

U.S. PATENT DOCUMENTS

| | | | |
|---|---|---|---|
| 3,858,557 A | 1/1975 | Myers et al. | |
| 4,215,534 A * | 8/1980 | Silvestri | 418/61.2 |
| 5,141,419 A * | 8/1992 | Adiwinata | 418/61.2 |
| 5,410,998 A * | 5/1995 | Paul et al. | 123/204 |
| 8,424,504 B2 * | 4/2013 | Garside | 123/200 |
| 2006/0233653 A1 * | 10/2006 | Trapalis | 418/54 |

FOREIGN PATENT DOCUMENTS

| | | |
|---|---|---|
| GB | 1068209 | 5/1967 |
| GB | 1385687 | 2/1975 |
| GB | 1386811 | 3/1975 |
| GB | 2199082 | 12/1987 |
| WO | 2007/017867 | 2/2007 |
| WO | 2009/101385 | 8/2009 |

OTHER PUBLICATIONS

Kai Tietje, International Search Report in PCT/GB2009/000610, Jun. 3, 2009, 2 pages, European Patent Office, Rijswijk, Netherlands.

Alex Swaffer, U.K. Search Report in GB0805089.0, Jun. 6, 2008, 1 page, U.K. Intellectual Property Office.

D. Eiermann et al., "The Introduction of a New Ultra-Lite Multipurpose Wankel Engine", SAE Technical Paper Series (900035), International Congress and Exposition, Detroit, Michigan, Feb. 26-Mar. 2, 1990, 12 pages, (XP007908780).

* cited by examiner

ROTARY PISTON INTERNAL COMBUSTION ENGINE POWER UNIT

This application is a U.S. National Stage filing under 35 U.S.C. §371 of International Application No. PCT/GB2009/000610, filed Mar. 6, 2009, which in turn claims priority to British Patent Application No. 0805089.0, filed Mar. 19, 2008.

The present invention relates to rotary piston internal combustion engine power unit.

More particularly the invention relates to a power unit which includes a so-called Wankel engine in which a rotary piston, or so called rotor rotates within a cavity formed by a housing or so called rotor housing, in combination with end housings or so called end casings, the rotor outer periphery and the inner peripheral surface of the cavity being so shaped that working chambers are formed between the rotor and inner walls which vary in volume as the rotor rotates, the cavity being provided with inlet and exhaust ports. In the best known example of an engine of the kind referred to the cavity is provided by a stationary rotor housing having a two lobed epitrochoidal shaped inner peripheral surface, and there is a rotor of substantially triangular shape but with convex arcuate flanks, seals or so called apex seals in the apices of the rotor maintaining sealing contact with the peripheral surface of the housing, and seals or so called side seals at the sides of the rotor maintaining sealing contact with two axially spaced end casings, and the rotor rotating in a planetary manner within the cavity.

More particular but not exclusively the main intended application for the invention is for use in series hybrid vehicles which have been derived from the so-called plug-in electric type. These vehicles are propelled solely by electric motor or motors, which are supplied with power from on-board batteries which are recharged from a mains power supply. Although the energy capacity per unit weight of such batteries has been progressively increased, a compromise has to be reached between the weight of the batteries and the vehicle range between the recharges.

Proposals have been made to install an on-board engine/generator unit or so-called genset that can be run intermittently to charge the batteries when required and thereby extend the vehicle's range. Such vehicles are termed series hybrids. The series hybrid vehicles here considered are vehicles with a range similar to conventional vehicles in that the range is limited only by the capacity of the engine fuel tank.

The power output of the genset is typically selected to match the power consumption of the vehicle at the desired maximum cruising speed when the genset is to supply continuously the electrical energy being consumed. Any additional energy required for intermittent acceleration is generally provided from, the battery.

The practicality of a series hybrid vehicle depends on the availability of a suitable genset.

Recent developments have made available high-speed electrical generators of low weight and high efficiency. Therefore the need is for a power unit which possesses characteristics of:
 low weight and bulk
 low specific fuel consumption (sfc)
 low noise and vibration
 low exhaust emissions of hydrocarbons (HC), carbon monoxide (CO) and nitrous oxides (NOx)
 acceptable production cost
 high reliability and long life with minimum servicing A spark-ignition Wankel-type engine with a single rotor has been identified in many past studies to be potentially the most suitable engine for this application, mainly because of its known light weight, small size, low level of vibration, and low cost particularly when compared to multi-cylinder reciprocating engines. However the other characteristics of sfc, HC emissions, and exhaust noise have not been sufficiently attractive to encourage electric car manufacturers to incorporate such an engine in a production design.

It is well known that if a means could be devised for substantially increasing the expansion ratio of a spark-ignition internal combustion engine without adding significant mechanical friction losses, then the thermal efficiency of such an engine would be increased.

In U.S. Pat. No. 3,858,557 it has been proposed to use in conjunction with a rotary engine, both a rotary pre-compressor and an expander unit. The engine can be operated as a compression ignition engine using diesel fuel, and the object of including the pre-compressor is to enable a sufficiently high overall compression ratio to be achieved whilst using a normal geometry rotary engine with compact combustion chamber. Alternatively, the engine could be operated as a stratified charge engine with direct injection around top dead centre and with spark ignition. Alternatively the engine could be operated with a carburettor and a homogenous mixture of gasoline fuel. In these two alternatives the object of including the compressor is to increase power output for a given size of core engine unit. The object of including the expander unit is to make a power contribution towards that consumed by driving the compressor, thereby improving the thermal efficiency.

In GB1068209 there is a proposal for a compound engine which includes a pre-compressor and an expander unit to operate as a compression ignition engine; and this arrangement may include spark plugs. The purpose of these spark plugs would be to assist cold starting and/or allow the use of alternative fuels possessing a lower cetane number than diesel fuel.

According to a first aspect of the invention I provide a power unit which has a spark-ignition engine unit of the Wankel type including a three flanked rotary piston mounted on an eccentric shaft rotating eccentrically within a cavity within a two lobed epitroochoidal inner peripheral surface, the cavity including an inlet port through which air at ambient pressure is induced into the working chambers, and an outlet port through which exhaust gasses are exhausted from the working chambers, and the power unit also including a rotary expander unit which has a two flanked rotor mounted on an eccentric shaft rotating eccentrically within a single lobed epitrochoidal chamber, both shafts being coupled to rotate together and the exhaust port of epitrochoidal cavity of the engine unit being connected to an inlet port of the expander unit so that the exhaust gasses from the engine unit are further expanded in the expander unit.

Such a power unit allows a much increased combined expansion ratio which may be at least twice the compression ratio of the engine or may be about 22 to 1.

The preferred type of rotary piston engine unit to be employed in this invention is as described in patent nos GB 1385687, GB 1386811 and GB 2199082, such engines having many of the ideal characteristics for this duty. Engines of this type employ equal value compression and expansion ratios typically in the range of 8.5 to 9.5 to 1.

The expander unit to be employed having the required low friction characteristic, low weight and bulk is another rotary piston machine of the so-called Wankel family in which the two flanked rotor of the expander unit is geared to rotate at one half the speed of the eccentric shaft in which it is mounted whereby two working chambers are formed between the expander unit rotor flanks and an inner surface of the single lobed epitrochoidal chamber, the single lobed epitrochoidal chamber having an exhaust port, there being a connecting duct between the exhaust port of the engine unit and the inlet port of the expander unit, the two shafts being geared or directly connected to run at the same speed and in a fixed phase relationship such that the exhaust gas from the engine unit is further expanded in the expander unit.

By this device, each working chamber of the expander unit changes its volume in a sinusoidal manner from maximum to minimum volume in each 360° rotation of the shaft, the two working chambers being 360° out of phase with each other. The ratio of the maximum working chamber volume to minimum working chamber volume is typically around 65 to 1, the volume of the working chamber when at its minimum therefore being very small.

The invention may incorporate any of the features set out in claims 2 to 12 appended hereto.

According to a second aspect of the invention I provide a combination, a power unit according to the first aspect of the invention, and an electrical generator, the generator including a rotor which is driven by one or other of the shafts of the engine unit and the expander unit.

According to a third aspect of the invention I provide a vehicle including a drive system for driving one of at least one wheel and/or at least one propeller, the driving system including a combination according to the second aspect of the invention, and an electrical storage device which receives charge from the generator, the wheel or propeller being driven by a motor of the drive system, the motor receiving electrical power from the electrical storage device.

Embodiments of the invention will now be described with reference to the accompanying drawings in which:—

Figure 1:
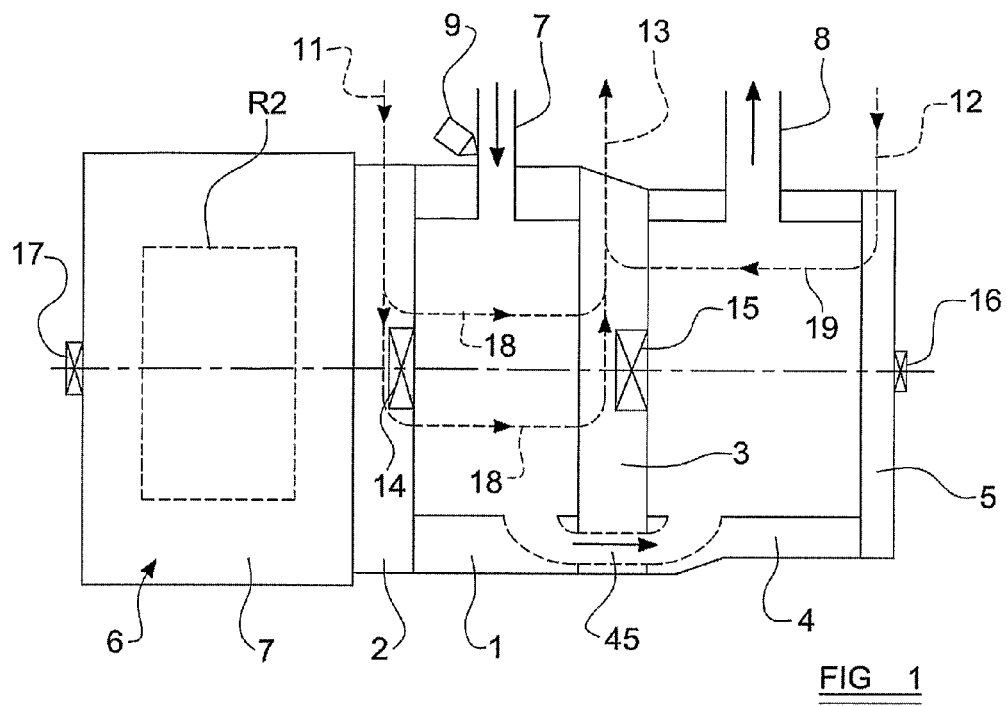
FIG. 1 is an illustrative diagram showing an arrangement of a power unit of the invention.
Figure 2:
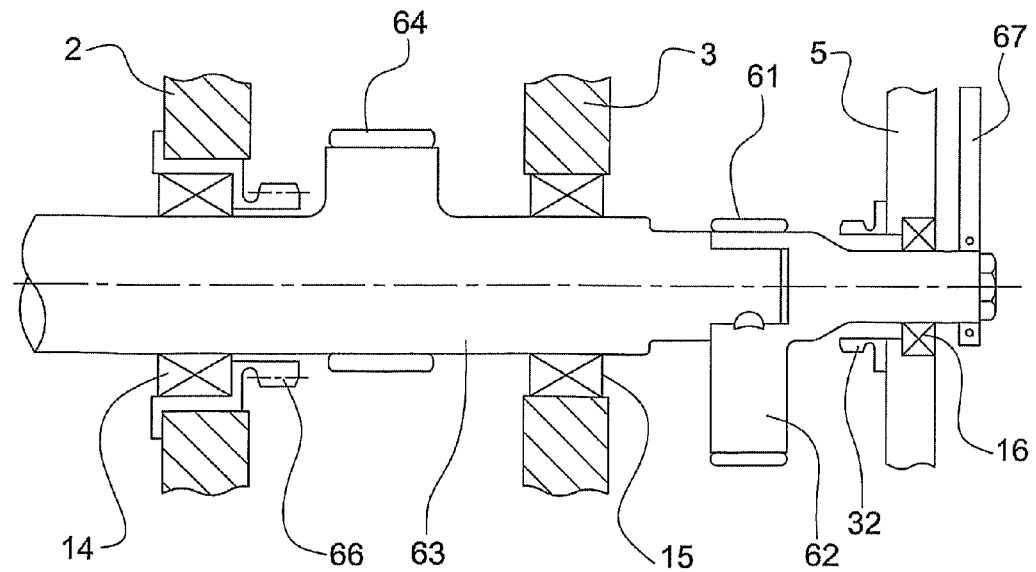
FIG. 2 is a schematic view illustrating the close integration of an eccentric shaft of an expander unit of the power unit of FIG. 1, with a shaft of an engine unit of the power unit.

Referring to FIGS. 1 and 2, an engine unit includes a rotor housing 1, end casings 2 and 3, and an induction duct 7. An expander unit is mounted co-axially with the engine unit and is cantilevered from the engine unit via a shared composite end casing 3. The expander unit includes a rotor housing 4, outboard end casing 5 and an exhaust pipe 8. A rotor 24 (see FIG. 3) of the expander unit engages with a stationary gear 32 and is mounted on an extension piece 62 of an engine eccentric shaft 63, the engine shaft 63 being journalled in two main bearings 14 and 15 mounted in end casings 2, 3 respectively.

A small tail bearing 16 for the expander unit is illustrated adjacent to an external balance weight 67. Thus the engine unit and expander unit shafts 63, 62 are coupled to rotate together.

The expander unit rotor 24 rotates at one half of the speed of the shaft 62 on which it is mounted.

Gas cooling flow for a rotor R (see FIG. 8) of the engine unit which is mounted on needle bearings 64 and engages with stationary gear 66, enters end casing 2 at 11, passes through axial passages 18 in the rotor R, and exits the engine unit at 13; a parallel cooling gas flow for the expander unit enters end casing 5 at 12, passes through an axial passage 19 in the rotor 24 and exits the expander unit, also in end casing 3 at 13. A fuel injector 9 is shown mounted in the induction duct 7, but direct injection into a cavity the rotor housing provides may alternatively be employed.

A stator 7 of a starter-generator unit 6 is mounted co-axially with the engine unit and is cantilevered from the engine end casing 2. A rotor R2 of the generator unit 6 is mounted in cantilever manner on an extension of the engine shaft 63. A small optional tail bearing 17 of a rotor shaft of the generator unit 6 is illustrated.

Figure 3:
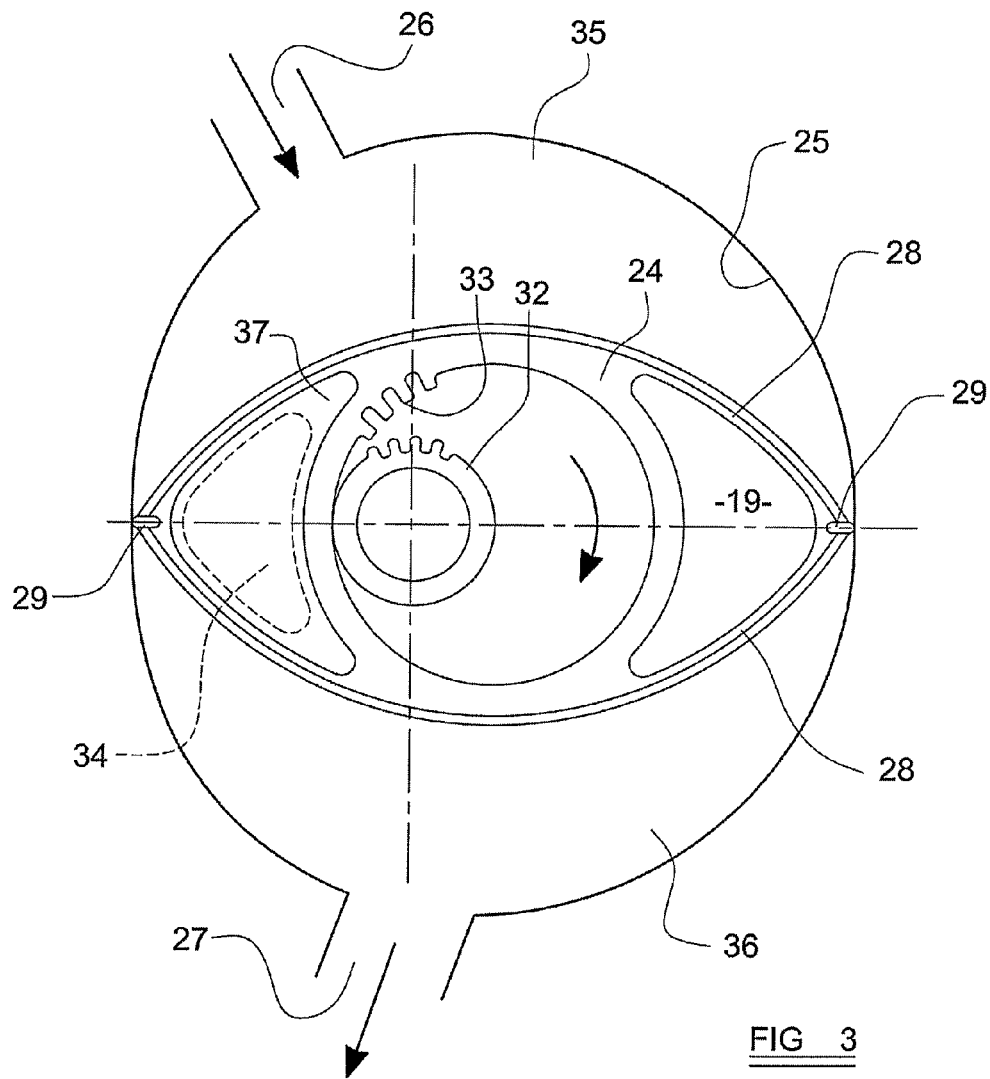
FIG. 3 is a diagrammatic axial view of a rotor of the expander unit inside the single lobed trochoidal housing at the mid expansion stroke/mid exhaust stroke position.
Figure 4:
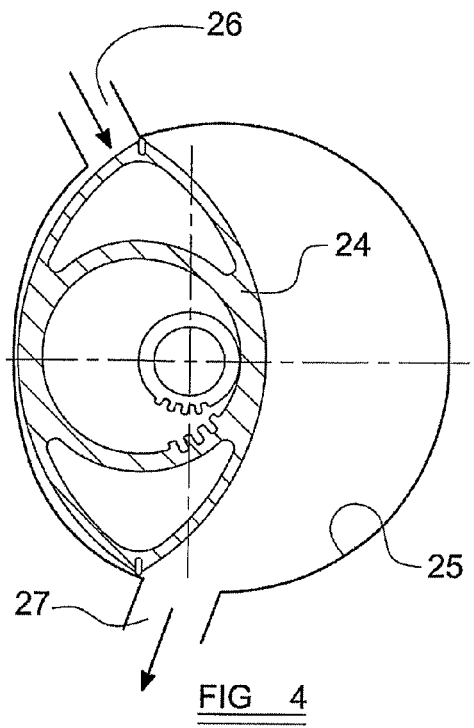
FIGS. 4, 5, 6 and 7 are diagrammatic views of the rotor of the expander unit in the TDC/BDC position as well as in three following positions with successive 90° intervals of the eccentric shaft.
Figure 5:
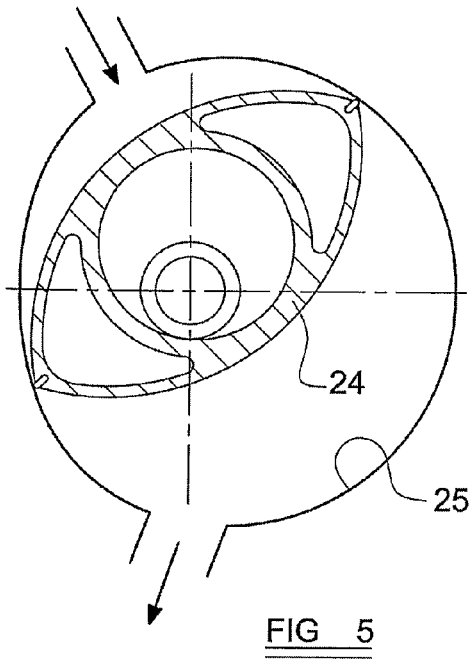
Figure 6:
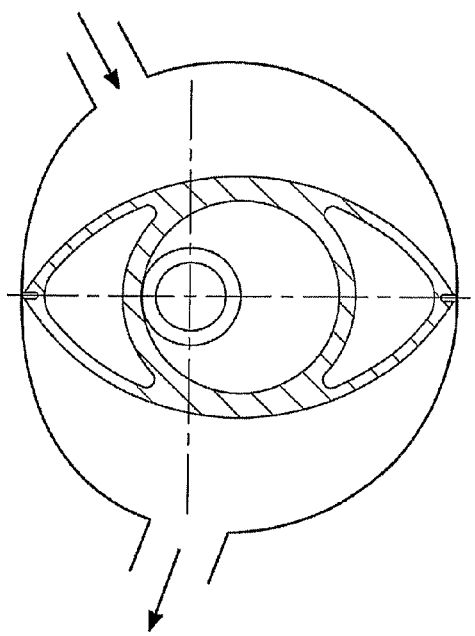
Figure 7:
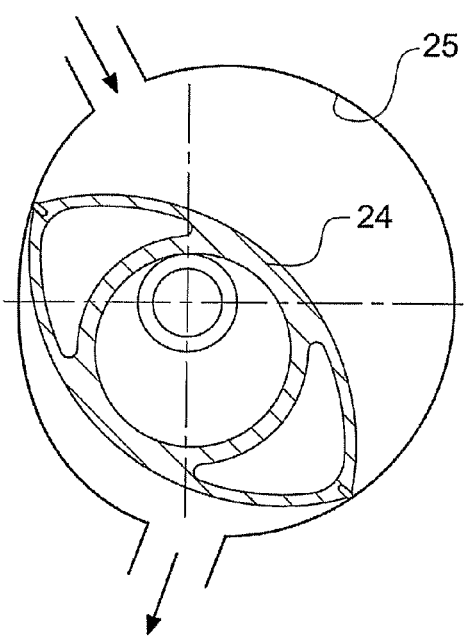

FIG. 3 illustrates the 2-cornered rotor 24 of the expander unit within a single lobed epitrochoidal chamber 25 of the rotor housing 4. An inlet port 26 to the expander unit, and an exhaust port 27 from the expander unit are shown. Gas sealing between the expander unit rotor 24 and the housing 4 is effected by apex seals 29 at each corner of the rotor 24, and side seals 28 are mounted in each side of the rotor 4. The apex seals 29 maintain sealing engagement with the inner two lobed epitrochoidal surface 25 of the housing 4 as the rotor 24 rotates, and the side seals 28 maintain sealing engagement with the end casings 3, 5 of the expander unit. The stationary gear 32 is mounted by the outboard end casing 5. An internal meshing ring gear 33 is mounted by or is integral with the rotor 24. Openings 34 in each end casing 3, 5 provide for the entry and exit for the cooling gas which passes through the axial passage (or passages) 19 in the rotor 24 for rotor cooling purposes, such openings 34 lying within a locus of the inner edge of the side seals 28 at all rotated positions of the rotor 24.

As the rotor 24 rotates in the epitrochoidal chamber 25, working chambers are formed. At 35 there is shown an expanding chamber which receives gas from the engine unit via a connecting duct 45 (see FIGS. 1, 8 and 9), and at 36 is shown an exhausting chamber from which gas passes to an exhaust silencer or to an exhaust pipe to exit the vehicle via an outlet port 27 which communicates with duct 8. FIG. 3 illustrates the very advantageous ratio of swept volume to overall size that is offered by this unit, and is a primary reason for its selection in this invention. Friction losses in the expander unit are low, there being no piston side thrust or high inertia loadings as in a reciprocating piston device, this being a second reason for its selection for this invention.

FIGS. 4, 5, 6 and 7 illustrates the expander unit rotor 24 at four different positions inside the epitrochoidal chamber 25. Pressurised gas from the engine unit enters the unit at inlet port 26 and exits at a pressure typically very slightly above ambient via exhaust port 27.

Figure 8:
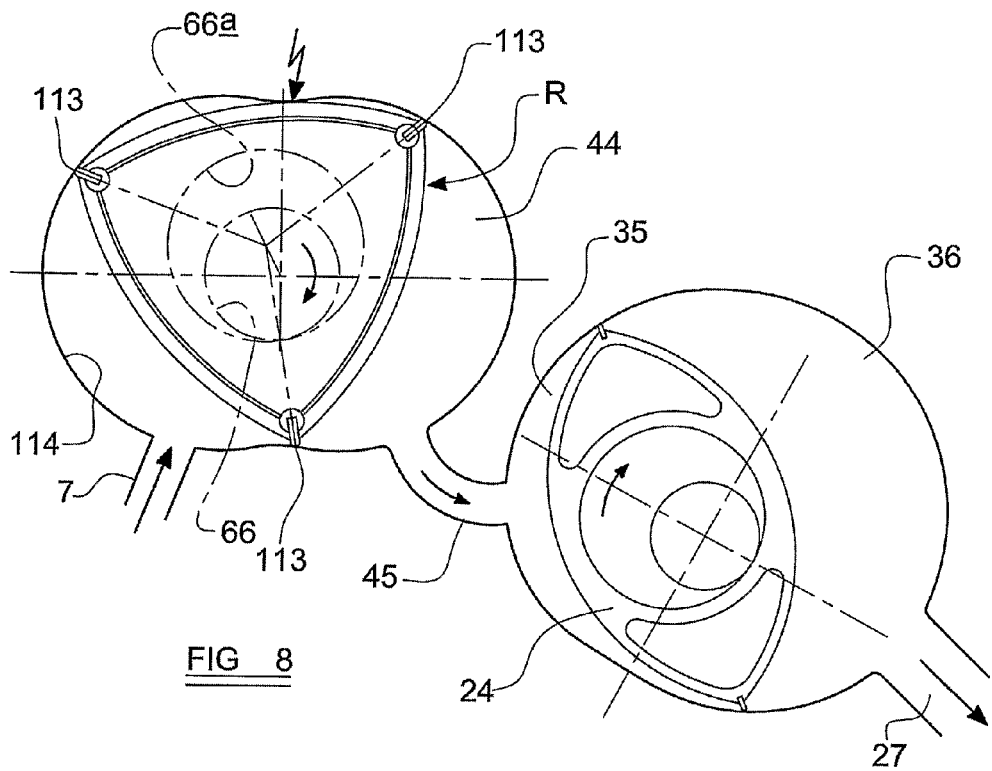
FIG. 8 is a diagrammatic co-planar view of the expander unit connected to an exhaust port of the engine unit.
Figure 9:
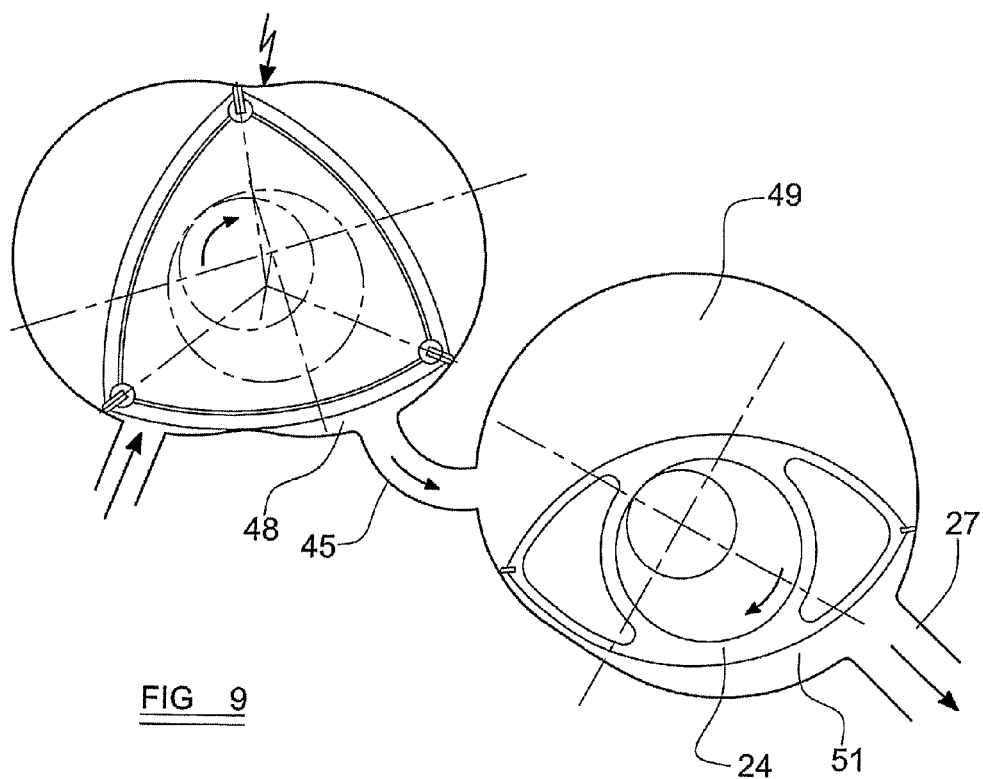
FIG. 9 is differentiated from FIG. 8 by 180° of shaft rotation.
Figure 10:
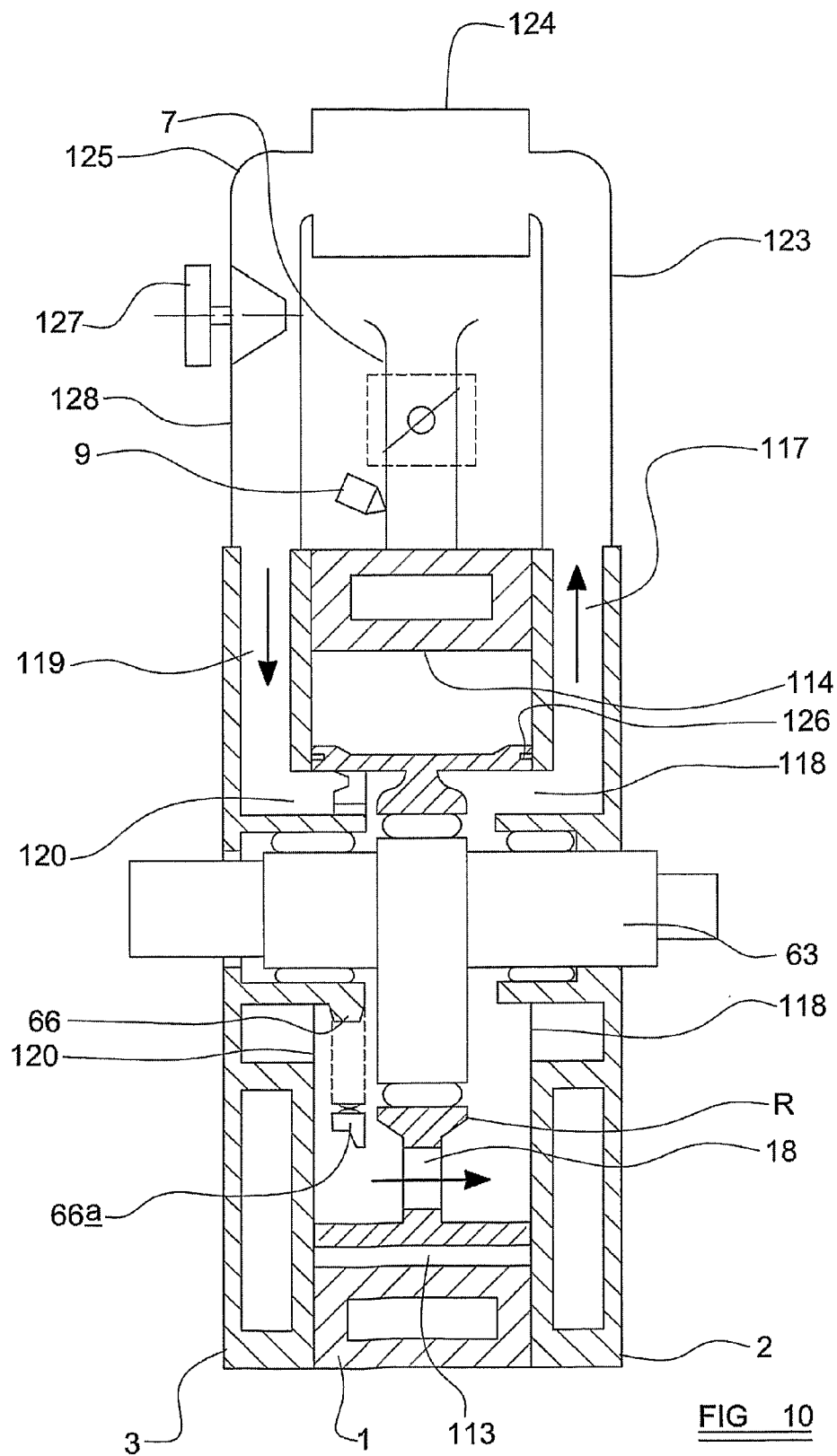
FIG. 10 is an illustrative view of the arrangement of a rotary engine, with a closed cooling circuit for the rotor which may be used in an engine unit or expander unit of a power unit in accordance with the invention.

The engine unit is shown diagrammatically in a co-planar manner in more detail in FIGS. 8 to 10.

It will be understood that the preferred arrangement is for the expander unit to be co-axial with the engine unit, FIGS. 8 and 9 being provided only to allow understanding of the relative movements of the two rotors.

The rotor housing 1 of the engine unit has a cavity with a two lobed epitrochoidal inner peripheral surface or bore between 14 between the end casings 2 and 3.

The engine unit rotor R has an apex seal being a sealing strip 113, disposed at each of its three apices, each sealing strip 113 maintaining sealing contact between its respective apex of the rotor R and the inner peripheral surface 114 as the rotor R rotates, in planetary manner, within the cavity. The rotor R rotates at a speed of one third that of the output shaft 63 and is controlled by the gears 66, 66a.

One end casing 3, has an inlet passage 119 which has one or more openings 120 disposed to either side of the stationary gear 32, the openings 120 being so shaped as to be contained within an inner envelope or rotation of side seals 126 described below, on the sides of rotor R which side seals 126 effect and maintain a seal between sides of the rotor R and the end casings 2 and 3. The end casing with the inlet passage 119 is an upstream casing 3 in terms of cooling gas flow.

The other end casing 2 is similarly provided with openings 118 and an outlet passage 117.

Rotor cooling medium can flow through inlet passage 119 in upstream end casing 3 and thence via the or each opening 120 in the end casing 3, to one or more openings 118 in the other downstream, end casing 2, through the interior of the rotor R, via the passageways 18 in e.g. a web of the rotor R to allow airflow therethrough.

A duct 123 connects the outlet passage 117 in the downstream end casing 2 to a cooling heat exchanger 124. A further duct 125 connects an exit of the cooling heat exchanger 124 to a cooling medium circulating pump 127, and a yet further duct 128 connects an exit from the pump 127 to the passage 119 in the upstream end casing 3. In another example, the pump 127 could be at the upstream side of the heat exchanger 124 as required.

A cooling circuit for cooling medium is thus established by the respective passageways 119, 117 in the upstream and downstream end casings 3, 2 the passageway or passageways 18 through the rotor R when the passageway or one of the passageways 18 through the rotor R is aligned with the or one of the openings 120 in the upstream end casing 3 and the or one or more of the openings 118 in the downstream end casing 2, and via the duct 123, to the heat exchanger 124, duct 125 to the pump 127 and duct 128 back to the inlet passage 119 in the upstream end casing 3.

In this example the cooling medium for the cooling circuit is provided by blow-by gasses passing from working chambers of the engine unit into the cooling circuit at pressure through a gas leakage path across side seals 126 between the working chambers of the engine unit and the cooling circuit.

A side seal 126 (at each side of the rotor R) extends, in this example, alongside a rotor flank, between each of two successive apex seals 113, around the rotor R, so that in the example, each of the three rotor flanks has a side seal 126, which side seals 126 the create an inner envelope of rotor rotation at each side of the rotor R.

The cooling heat exchanger 124 may be of any suitable type which produces cooling of the cooling gas in the cooling circuit. Typically in the heat exchanger 124 ambient air is the coolant. However, in an engine used in an marine environment, e.g. to power a boat, the coolant may more preferably be water.

The cooling circuit pump 127 may be of any suitable type but may be a centrifugal fan type mechanically driven from the output shaft 63 of the engine unit or by an electric motor or by a turbine powered by the exhaust gasses of the engine, as required.

The cooling circuit for the rotor R of the engine unit 1 may be connected preferably in parallel to the cooling circuit for the rotor 24 of the expander unit 4, so that the rotor R of the engine unit and the rotor 24 of the expander unit 4 are both gas cooled by a common cooling circuit, there being a common cooling heat exchanger 124 for supplying cooling gas for cooling both rotors R, 24. If desired, the expander unit 4 could though have a separate cooling circuit similar to that shown in FIG. 10 for the engine unit 1.

In another example, instead of a rotor cooling circuit as described, the rotor 24 of the expander unit 4, may otherwise be gas cooled e.g. by air.

FIG. 8 illustrates the exhaust working chamber 44 of the engine unit transferring pressurised gas via passageway 45 to the receiving working chamber 35 of the expander unit. Simultaneously the exhausting chamber 36 of the expander unit is ejecting gas via the exhaust port 27.

FIG. 9 shows the situation when the shafts 62, 63 upon which the rotors 24, R are mounted have rotated by 180° relative to FIG. 8. Exhaust working chamber 48 of the engine unit is near its minimum volume and the connected chamber 49 in the expander unit is near its maximum volume. Exhaust working chamber 51 of the expander unit is close to the end of the exhaust stroke.

Desirably, the expansion ratio of the combined engine unit and expander unit is around 22 to 1 and that expansion ratio, of the combined engine unit and expander unit, is preferably in any event, at least twice as great as can be achieved by the engine unit alone.

Although it is preferred that the generator 6 is mounted co-axially to the power unit 1/4, this may be otherwise mounted but desirably is driven by the power unit or expander unit.

The dimensions of the expander unit 4 may be selected to be such that the maximum working chamber volume is about 2.8 times that of the engine unit swept volume although this will depend on the selected expansion ratio.

The angular relationship between the rotors of the engine and expander units is such that when the expansion working chamber volume of the engine unit is approaching a maximum value and its exhaust port begins to open, the working chamber in the expander unit to which the engine exhaust port is connected via duct 45 is close to its minimum volume. As the engine unit performs its exhaust phase, the expander unit receives the exhaust gas and further expands it to a final pressure only slightly above ambient thereby extracting extra energy from the gasses. At this point the exhaust port 27 of the expander unit opens and the exhaust gasses are expelled to atmosphere or to an exhaust silencer during the next 360° of shaft 62 rotation. Simultaneously, the next working chamber of the expander unit has received the gas being exhausted from the following chamber of the engine unit and the cycle is repeated.

The geometry and design of the expander unit is chosen to be of a compact and low friction kind with the ratio of the rotor 24 radius dimension (rotor centre to rotor corner) being around 4.3 times the eccentricity of the shaft 62 upon which it is mounted. With such a design the expander unit can be of similar diameter to the engine unit and is then also of similar axial length despite having almost three times the swept volume, such is its spatial efficiency. Thereby a compact package is created.

The preferred arrangement is that the engine and expander units are axially in line and the eccentric shaft 62 of the expander unit is a cantilevered extension piece of the shaft of the engine unit thereby saving weight and friction losses.

The relative angular positioning about the shaft 63, 62 axis of the engine unit and the expander unit may be such that the exhaust port of the engine unit and the inlet port 26 of the expander unit will be adjacent.

The maximum gas pressure entering the expander unit is only around 4 bar and so gas pressure loads within the expander unit are low. The expander unit has, in common with all Wankel-type units, no rotor axial side thrust, and because of the low gas pressures involved can employ low-friction carbon type or similar apex seals 29 and radially thin low-friction side seals 28. The apex seals 29 are not subjected to any outward acceleration forces so very light load springs can be used for the apex gas seals. The overall result is a unit with extremely low parasitic friction losses.

If the expander unit were to have zero friction losses and zero gas transfer energy losses in the transfer of gas from the engine unit to the expander unit then, by increasing the overall expansion ratio to around 22 to 1, calculations based on the compound p-v diagram show that the power output of the combined units would be raised by around 33% relative to the that of the engine unit alone. The sfc and emissions would be reduced by a similar percentage. In practice the expander unit does have some friction losses and there will be some small transfer energy losses; hence such gains will not be achieved. In practice the net gains achieved by the additional of the expander unit to the engine may amount to around 20%.

The standard type Wankel engine, particularly in single rotor form, produces a level of exhaust noise which is considerably higher than that of a reciprocating engine. The reason is that, in the former, there exists the rapid full opening of a single exhaust port and the sudden release of gasses at a high temperature and with a pressure of around 3 to 4 bar; whereas in the latter there is a much slower opening of exhaust valves and the spilling then of the exhaust gasses into an exhaust manifold joining together the exhaust streams from the other cylinders before emerging from the engine.

The compounding of the rotary engine with an expander unit providing an expansion ratio of 22 to 1 as described above in order to reduce the sfc also makes a major contribution to reduction of exhaust noise. When the exhaust port of the expander unit now opens, the exhaust gas temperature has been reduced by around 400° C. relative to the temperature of the gasses leaving the engine unit and the pressure is close to ambient. The result will be an extremely low level of exhaust noise even without the fitting of any additional exhaust silencer. The exhaust noise problem with known rotary combustion engines has therefore been eliminated.

At low rpm and part-throttle openings, the rotary engine has significantly higher emissions of HC than a reciprocating engine; whereas CO emissions are similar, and Nox emissions are lower. A power unit of the invention is preferably only operated at high rpm and unthrottled, under which conditions the HC emission problem of the engine unit alone is not so unfavourable and existing types can be similar or even superior to reciprocating engines. However, the additional compounding of the rotary engine with an expander unit has a further important beneficial effect in that it will significantly reduce the level of HC exhaust emissions.

The very hot exhaust gas from the engine unit is discharged with considerable turbulence into the expander unit. Except momentarily during cold starting the engine will be operated with considerable excess air relative to stoichimetric value and therefore there is excess oxygen available for further combustion. The expander unit will then act as a thermal reactor and will reduce the emission of HC to an extremely low level.

Overall, the compounding of the so-called 2-3 type Wankel engine unit (a three cornered rotor in a two lobed housing) with the so-called 1-2 type Wankel expander unit (two cornered rotor in single lobed housing) offers significant improvements in relation to each of the three previously deficient characteristics of sfc, exhaust noise, and HO emissions.

Figure 11:
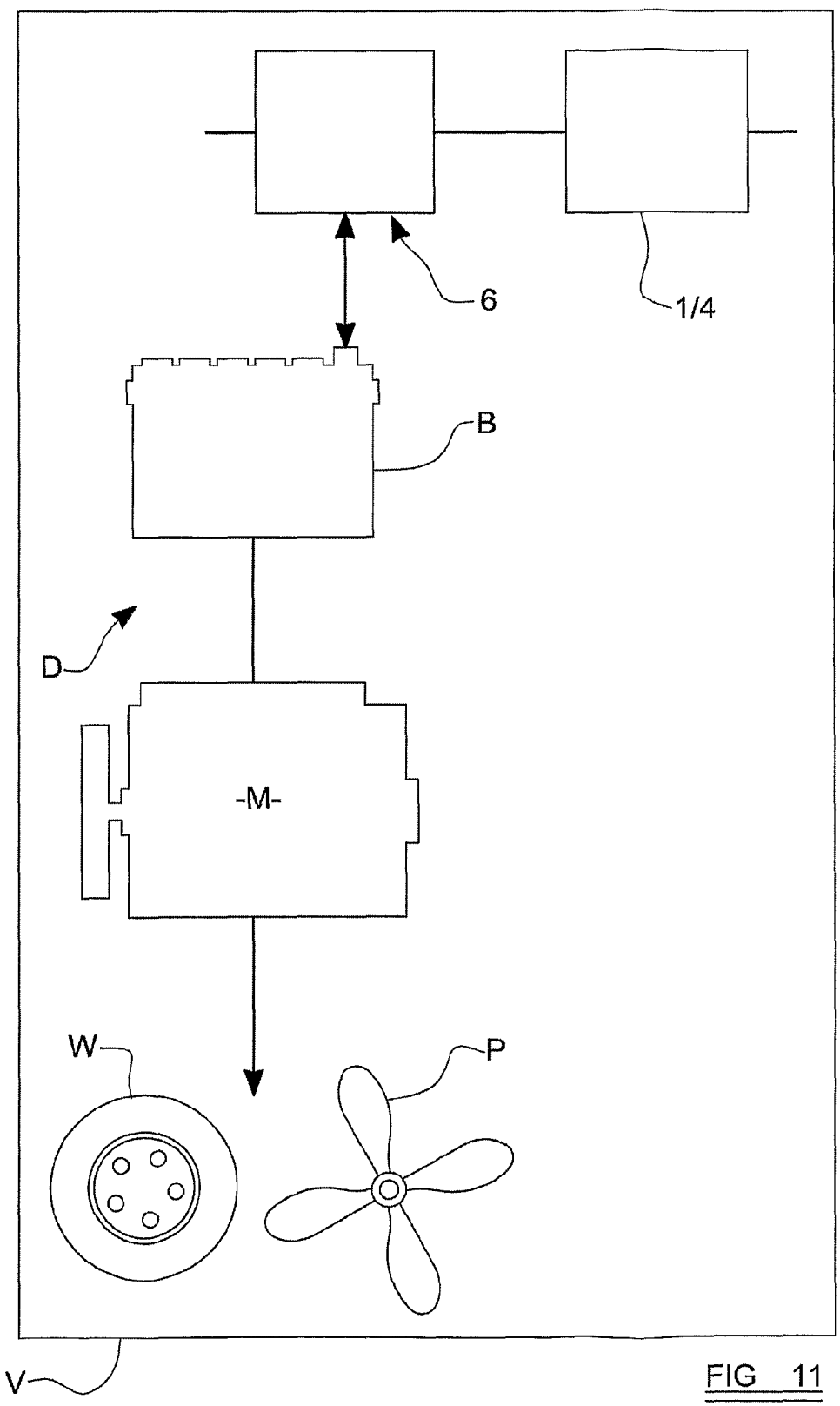
FIG. 11 is an illustration of a hybrid vehicle of the third aspect of the invention.

Referring now to FIG. 11, a vehicle V is illustrated, which includes a driving system D for driving either one or more wheels W (e.g. for a ground based vehicle V—including a tracked vehicle) or one or more propellers P (as in the case of a marine vehicle (e.g. boat) or aircraft, including an unmanned aircraft (UAV).

The driving system D includes an electrical storage device such as battery B, which drives one or more motors M for turning the wheel(s) W and/or propeller(s) P.

The battery B is either charged, when the vehicle is not in use, by connecting to a fixed electrical source, such as a socket, via a plug connector C, or is charged in use, by the operation of the generator 6.

Electrical energy to charge the battery B may also be generated by the generator when the vehicle is in braking/downhill mode.

In such an application, the power unit 1/4 may be operated at a single speed only, being the optimum speed in terms of thermal efficiency. Thus the power unit may be throttleless, although it will be appreciated that at high generator load the engine speed may decrease below the nominal optimum speed.

At high generator load, which could tend to deplete the battery B, if desired, temporarily, for a short period, the power unit 1/4 may be arranged to operate at a speed greater than the optimum speed, to recharge the battery B.

In the example, the generator 6 is capable not only of generating electrical power to charge the battery B, but may be used to drive the power unit 1/4 to initiate start-up of the power unit 1/4.

Although the power unit is particularly efficacious when used to power a series hybrid vehicle as described, the power unit may be used in other applications, such as for examples only, as an auxiliary power unit for e.g. an executive aircraft, or for generating heat and power in a suitable application. In each case, the power unit is capable of prolonged operation at desirably, a single optimum rotational speed, to delivery power most efficiently and quietly.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A power unit which has a spark-ignition engine unit including a three flanked rotary piston mounted on an engine eccentric shaft rotating eccentrically within an epitrochoidal cavity that has a two lobed epitrochoidal inner peripheral surface, the cavity including an engine inlet port through which air at ambient pressure is induced into the working chambers, and an engine outlet port through which exhaust gasses are exhausted from the working chambers, and the power unit also including a rotary expander unit which has a two flanked rotor mounted on an expander eccentric shaft rotating eccentrically within a single lobed epitrochoidal chamber, both of the engine eccentric shaft and the expander eccentric shaft being coupled to rotate together and the engine exhaust port of the epitrochoidal cavity of the spark-ignition engine unit being connected to an expander inlet port of the rotary expander unit so that the exhaust gasses from the spark-ignition engine unit are further expanded in the rotary expander unit, wherein the two flanked rotor of the rotary expander unit is gas cooled, cooling gas passing through axial passages inside the two flanked rotor, these axial passages communicating with openings in end casings of the rotary expander unit which close the single lobed epitrochoidal chamber, said openings lying at each side of the two flanked rotor, inside an inner locus of side seals provided at sides of the two flanked rotor and which maintain sealing contact with the rotary expander unit end casings.

2. The power unit according to claim 1 wherein the two flanked rotor of the rotary expander unit is geared to rotate at one half speed of the expander eccentric shaft on which it is mounted whereby working chambers are formed between the two flanked rotor flanks and an inner surface of the single lobed epitrochoidal chamber, the single lobed epitrochoidal chamber having an engine exhaust port, there being a connecting duct between the engine exhaust port of the spark-ignition engine unit and the expander inlet port of the rotary expander unit, both of the engine eccentric shaft and the expander eccentric shaft being geared or directly connected to run at the same speed and in a fixed phase relationship such that the exhaust gas from the spark-ignition engine unit is further expanded in the rotary expander unit.

3. The power unit as claimed in claim 1 wherein the expansion ratio of the combined spark-ignition engine unit and rotary expander unit is greater than twice the compression ratio achieved by the spark-ignition engine unit alone.

4. The power unit as claimed in claim 1 wherein the expansion ratio of the combined spark-ignition engine unit and rotary expander unit is around 22 to 1.

5. The power unit as claimed in claim 1 wherein the cooling gas is recirculated from the rotary expander unit, through a heat exchanger where the cooling gas is cooled, back to the rotary expander unit for further cooling of the two flanked rotor.

6. The power unit as claimed in claim 1 wherein the three flanked rotary piston of the engine unit is also gas cooled and a common circulating fan and common cooling heat exchanger is used for the supply of cooling gas for cooling both the two flanked rotor and the three flanked rotary piston.

7. The power unit as claimed in claim 1 wherein the rotary expander unit is mounted co-axially with the spark-ignition engine unit and the expander inlet port of the rotary expander unit is aligned with the engine exhaust port of the spark-ignition engine unit.

8. The power unit as claimed in claim 7 wherein the expander eccentric shaft of the rotary expander unit is mounted on an extension of the engine eccentric shaft of the spark-ignition engine unit.

9. The power unit as claimed in claim 1 wherein an electric generator unit is mounted co-axially to the power unit in driving connection thereto.

10. The power unit as claimed in claim 9 wherein a generator rotor of the electric generator unit is mounted on an extension of the engine eccentric shaft at the opposite end of the engine eccentric shaft to the rotary expander unit.

11. The power unit as claimed in claim 1, wherein the spark-ignition engine unit is throttleless so that in use the spark-ignition engine unit operates at only a nominal fixed single pre-specified speed at least in the absence of a load.

12. The power unit according to claim 1 in combination with an electrical generator, the electric generator including a generator rotor which is driven by either one of the engine eccentric shaft and the expander eccentric shaft.

13. A hybrid vehicle including a drive system for driving one of at least one wheel and at least one propeller, the driving system including a combination of the power unit according to claim 1 and an electrical generator, the generator including a generator rotor which is driven by either one of the engine eccentric shaft and the expander eccentric shaft and the hybrid vehicle including an electrical storage device which receives charge from the electric generator, the at least one wheel or the at least one propeller being driven by a motor of the drive system, the motor receiving electrical power from the electrical storage device.

* * * * *